(12) United States Patent
Lee et al.

(10) Patent No.: US 7,968,247 B2
(45) Date of Patent: Jun. 28, 2011

(54) HIGH TEMPERATURE FUEL CELL USING ALKYL PHOSPHORIC ACID

(75) Inventors: Doo-yeon Lee, Yongin-si (KR);
Hee-young Sun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 810 days.

(21) Appl. No.: 11/433,527

(22) Filed: May 15, 2006

(65) Prior Publication Data
US 2006/0263662 A1 Nov. 23, 2006

(30) Foreign Application Priority Data

May 18, 2005 (KR) .................. 10-2005-0041654

(51) Int. Cl.
*H01M 8/10* (2006.01)
(52) U.S. Cl. ..................... 429/492; 429/307
(58) Field of Classification Search ............. 429/33, 429/307, 46, 492
See application file for complete search history.

(56) References Cited

U.S. PATENT DOCUMENTS

| | | | |
|---|---|---|---|
| 6,635,384 B2 * | 10/2003 | Bahar et al. ............. | 429/33 X |
| 6,733,927 B1 | 5/2004 | Takezawa et al. | |
| 6,770,393 B2 * | 8/2004 | Akita et al. ............. | 429/33 |
| 6,828,407 B2 | 12/2004 | Sasaki et al. ............. | 528/86 |
| 7,618,732 B2 * | 11/2009 | Nakato et al. ............ | 429/33 |
| 2004/0142246 A1 | 7/2004 | Han et al. | |
| 2005/0118476 A1* | 6/2005 | Melzner et al. ........... | 429/33 |
| 2006/0172201 A1 | 8/2006 | Yasukawa et al. | |
| 2006/0234099 A1 | 10/2006 | Muellen | |
| 2007/0087244 A1 | 4/2007 | Melzner et al. | |

FOREIGN PATENT DOCUMENTS

| | | |
|---|---|---|
| CN | 1165826 | 11/1997 |
| CN | 1310867 | 8/2001 |
| CN | 1411619 | 4/2003 |
| CN | 1432604 | 7/2003 |
| CN | 1518155 | 8/2004 |
| EP | 967674 A1 * | 12/1999 |
| JP | 8-180890 | 7/1996 |
| JP | 9-110982 | 4/1997 |
| JP | 11-339824 | 12/1999 |
| JP | 2000-038472 | 2/2000 |
| JP | 2001-351648 | 12/2001 |
| JP | 2003-151582 | 5/2003 |
| JP | 2003-327826 | 11/2003 |
| WO | WO 2004/005373 | 1/2004 |
| WO | 2004/066428 | 8/2004 |

OTHER PUBLICATIONS

First Office Action issued Mar. 28, 2008 by the Patent Office of the People's Republic of China re: Chinese Application No. 2006100848247 (7 pp).
Notice to Submit Response issued Jul. 27, 2006 by the Korean Intellectual Property Office re: Korean Patent Application No. 2005-41654 (5 pp).
Certificate of Patent No. ZL 2006 1 0084824.7 issued in the corresponding Chinese patent application on Dec. 23, 2009 (including Chinese application CN 100572430C).

* cited by examiner

*Primary Examiner* — Stephen J. Kalafut
(74) *Attorney, Agent, or Firm* — Christie, Parker & Hale, LLP

(57) ABSTRACT

Provided are a polymer electrolyte membrane and a fuel cell including the same. The polymer electrolyte membrane has a phosphoric acid that is substituted with an aliphatic hydrocarbon. The polymer electrolyte membrane has excellent ion conductivity, heat resistance, and liquid-holding properties. The fuel cell including the polymer electrolyte membrane exhibits excellent performance.

12 Claims, 3 Drawing Sheets

HIGH TEMPERATURE FUEL CELL USING ALKYL PHOSPHORIC ACID

CROSS-REFERENCE TO RELATED APPLICATION

This application claims the benefit of Korean Application No. 2005-41654, filed May 18, 2005, in the Korean Intellectual Property Office, the entire content of which is incorporated herein by reference.

BACKGROUND OF THE INVENTION

1. Field of the Invention

Aspects of the present invention relate to a polymer electrolyte membrane and a fuel cell including the same, and more particularly, to a polymer electrolyte membrane that is formed using a phosphoric acid substituted with an aliphatic hydrocarbon to attain excellent ion conductivity, heat resistance and liquid holding properties.

2. Description of the Related Art

A group of fuel cells form an energy generating system in which energy of a chemical reaction between oxygen and hydrogen contained in a hydrocarbon-based material (such as methanol, ethanol, or natural gas) is directly converted into an electrical energy. Fuel cells can be categorized into phosphoric acid type fuel cells, molten carbonate type fuel cells, solid oxide type fuel cells, polymer electrolyte membrane fuel cells (PEMFCs), alkali type fuel cells, and the like, according to the electrolyte that is used. These fuel cells operate based on the same principle, but have different fuels, different operating temperatures, different catalysts, different electrolytes, etc.

Among these fuel cells, the PEMFC has better energy output properties, a lower operating temperature, quicker initial operation, and a quicker response than the other fuel cells. Due to these advantages, the PEMFC has a wide range of applications, which include a portable power source for cars, an individual power source for homes or public buildings, and a small power source for electronic devices.

Conventionally, a PEMFC includes a polymer electrolyte membrane composed of a polymer electrolyte, such as a perfluoro sulfonate polymer (for example, NAFION produced by Dupont Inc.) that has a main chain of an alkylene fluoride and a side chain of vinyl ether fluoride terminated with a sulfonic acid group. In this case, it is noteworthy that the polymer electrolyte membrane attains high ionic conductivity by impregnation with a proper amount of water.

In order to prevent dehydration of the polymer electrolyte membrane of the PEMFC, the conventional PEMFC operates at 100° C. or less, for example, about 80° C. However, such a low temperature of 100° C. or less results in the following problems. A hydrogen-rich gas, which is a main fuel for the PEMFC, can be obtained by reforming an organic fuel, such as a natural gas or methanol. In this case, however, the hydrogen-rich gas contains CO as well as $CO_2$ as a by-product. The CO poisons catalysts contained in a cathode and an anode of the PEMFC. When a catalyst is poisoned with CO, its electrochemical activity decreases significantly, and thus, the operation efficiency and lifetime of the PEMFC decrease significantly. In particular, it is noteworthy that the catalyst is more prone to poisoning when the operating temperature of the PEMFC is lower.

However, the temperature of the PEMFC can be easily controlled and when the operating temperature of the PEMFC is increased to about 150° C. or higher, the poisoning of the catalyst with CO can be prevented. As a result, a fuel reformer can be miniaturized and a cooling device can be simplified, and thus, the entire energy generating system of the PEMFC can be miniaturized. However, the conventional electrolyte membrane, that is, a polymer electrolyte such as the perfluoro sulfonate polymer (for example, NAFION produced by Dupont Inc.) that has a main chain of a alkylene fluoride and a side chain of vinyl ether fluoride terminated with a sulfonic acid group, experiences a significant drop in performance due to evaporation of moisture at a high temperature as described above. In addition, a polymer containing a sulfonic acid group fails to maintain its original form at about 120° C. or higher. As a result, the polymer electrolyte membrane formed using the perfluoro sulfonate polymer cannot act as an electrolyte membrane at high temperatures.

In order to solve this problem, non-humidified polymer electrolytes that can operate at high temperatures have been actively researched, and are based mainly on a polybenzimidazole (PBI)-phosphoric acid system that uses a phosphoric acid ($H_3PO_4$) as a proton conductor. The PBI-phosphoric acid system generally uses so called, 85% phosphoric acid containing 85% ortho-phosphoric acid. However, the ortho-phosphoric acid dissolves in water generated by the reaction between the hydrogen ions and oxygen molecules, and thus, the ionic conductivity of the electrolyte membrane decreases, and when the fuel cell operates for a long time at a high temperature, the polymer matrix dissolves in the phosphoric acid. In other words, when used at high temperature, a condensation reaction occurs among phosphoric acid molecules, thus forming a polyphosphoric acid. The formed polyphosphoric acid decreases the ionic conductivity and dissolves the polymer electrolyte membrane.

In order to solve this problem, the ortho-phosphoric acid can be replaced with a phenyl group (see U.S. Pat. No. 6,478, 987). In this case, however, the acidity of a hydroxyl group of a phosphoric acid is decreased, and thus, the ionic conductivity decreases.

Accordingly, more research is required to develop a polymer electrolyte membrane that has heat resistance for maintaining the polymer electrolyte membrane at a high temperature for a long operating time, a liquid-holding property for reducing the leakage of the impregnated phosphoric acid, and excellent ionic conductivity.

SUMMARY OF THE INVENTION

Aspects of the present invention provide a polymer electrolyte membrane having excellent ion conductivity, heat resistance, and liquid-holding properties. Another aspect of the present invention provides a method of producing the polymer electrolyte membrane. Another aspect of the present invention provides a membrane electrode assembly including the polymer electrolyte membrane. Another aspect of the present invention provides a fuel cell including the polymer electrolyte membrane.

According to an aspect of the present invention, there is provided a polymer electrolyte membrane including a polymer matrix impregnated with a phosphoric acid, some of the phosphoric acid having one or two hydrogen atoms substituted with an aliphatic hydrocarbon.

According to another aspect of the present invention, there is provided a method of manufacturing the polymer electrolyte membrane, the method including: preparing a mixed phosphoric acid solution by mixing a phosphoric acid having one or two hydrogen atoms substituted with an aliphatic hydrocarbon, and an ortho-phosphoric acid; and impregnating a polymer matrix with the mixed phosphoric acid.

According to yet another aspect of the present invention, there is provided a membrane electrode assembly including the polymer electrolyte membrane.

According to still another aspect of the present invention, there is provided a fuel cell including a cathode, an anode and the polymer electrolyte membrane interposed therebetween.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
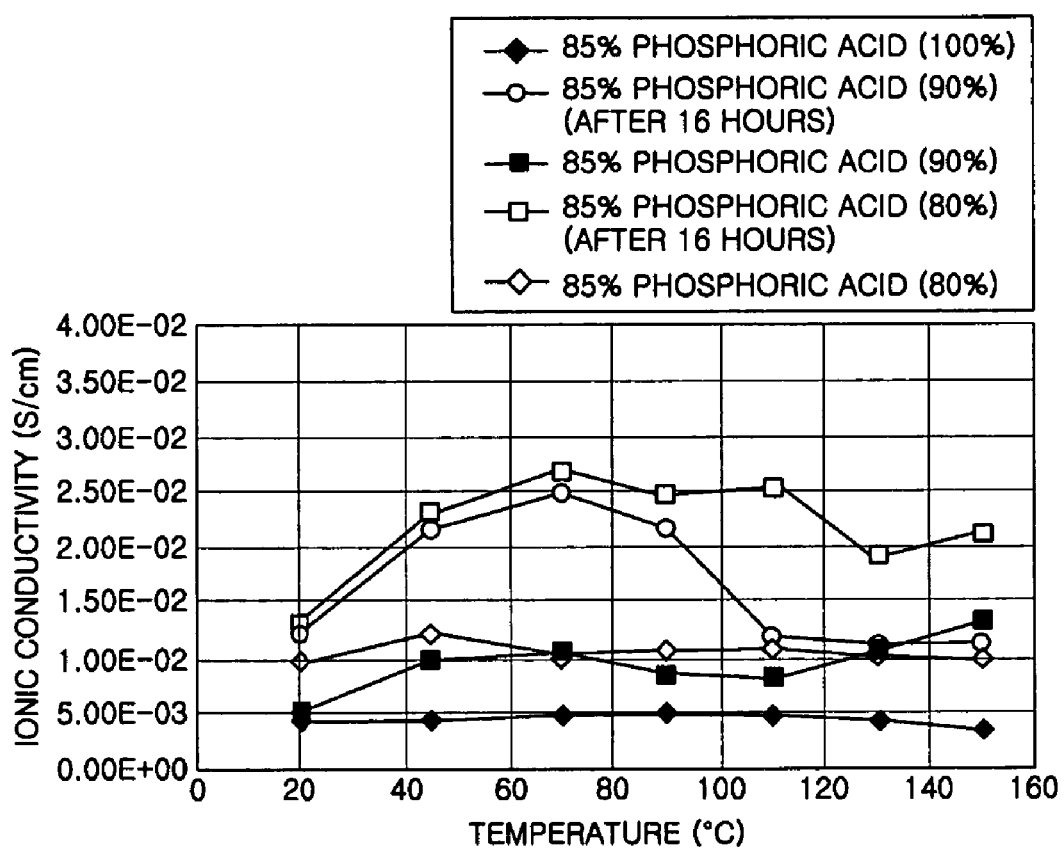
FIG. 1 is a graph of ionic conductivity with respect to temperature of polymer electrolyte membranes according to Examples 1 and 2 and Comparative Example 1.

Reference will now be made in detail to example embodiments of the present invention, some of which are illustrated in the accompanying drawings, in order to more fully explain the present invention.

An embodiment of the present invention relates to a polymer electrolyte membrane that contains a phosphoric acid impregnated in a polymer matrix. The phosphoric acid has one or two hydrogen atoms substituted with an aliphatic hydrocarbon. In the polymer electrolyte membrane, the phosphoric acid is impregnated in the polymer matrix such that the phosphoric acid is uniformly distributed.

The polymer matrix used to form the polymer electrolyte membrane can be any polymer in which proton conductors can be uniformly distributed and which can durably maintain the stable distribution of proton conductors over a wide range of temperatures. For example, the polymer matrix can be polybenzimidazole, but is not limited thereto.

The aliphatic hydrocarbon may be an alkyl group, an alkenyl group, an alkynyl group, an alkoxy group, or combinations thereof, but is not limited thereto. The alkyl group may be substituted with a halogen atom, such as fluorine (F), chlorine (Cl), bromine (Br), and/or iodine (I), to have excellent ionic conductivity. However, the alkyl group is not limited thereto. Among the halogen atoms, F may be used to improve ionic conductivity.

The phosphoric acid that is used in the polymer electrolyte membrane according to an embodiment of the present invention may be substituted with an aliphatic hydrocarbon rather than with an aromatic ring. The aromatic ring, which is an electron donating group, decreases acidity of a neighbouring hydroxyl group to decrease ionic conductivity. The halogen atom, which is an electron withdrawing group, increases acidity of a neighbouring hydroxyl group to improve proton conductivity. In addition, the halogen atom may be F, which is the element with the highest electronegativity. The phosphoric acid that is substituted with an aliphatic hydrocarbon may be used in liquid form by being mixed with the ortho-phosphoric acid, because the phosphoric acid substituted with an aliphatic hydrocarbon exists in a solid state at room temperature.

The amount of the phosphoric acid substituted with an aliphatic hydrocarbon may be in the range of 0.1 to 40% by weight, preferably, 5-25% by weight based on the weight of the entire phosphoric acid including the ortho-phosphoric acid. When the amount of the phosphoric acid substituted with an aliphatic hydrocarbon is less than 0.1% by weight, the effects of the present invention, such as high ionic conductivity, durability, and a liquid-holding property, cannot be obtained. On the other hand, when the amount of the phosphoric acid substituted with an aliphatic hydrocarbon is greater than 40% by weight, the phosphoric acid may easily become solid so that the uniform distribution of the phosphoric acid in the matrix polymer is difficult to achieve.

The phosphoric acid substituted with an aliphatic hydrocarbon may be one that is commercially available, or can be directly prepared for use. The manufacturing method for the phosphoric acid is not limited. The phosphoric acid substituted with an aliphatic hydrocarbon can be prepared by reacting a halogen salt of an aliphatic hydrocarbon with a phosphoric acid in an alkyl amine solution, as shown in Reaction Scheme 1. Alternatively, the phosphoric acid substituted with a hydrocarbon can be prepared by reacting a halogen salt of an alicyclic hydrocarbon with $(EtO)_2PONa$ in an acidic solution, as shown in Reaction Scheme 2.

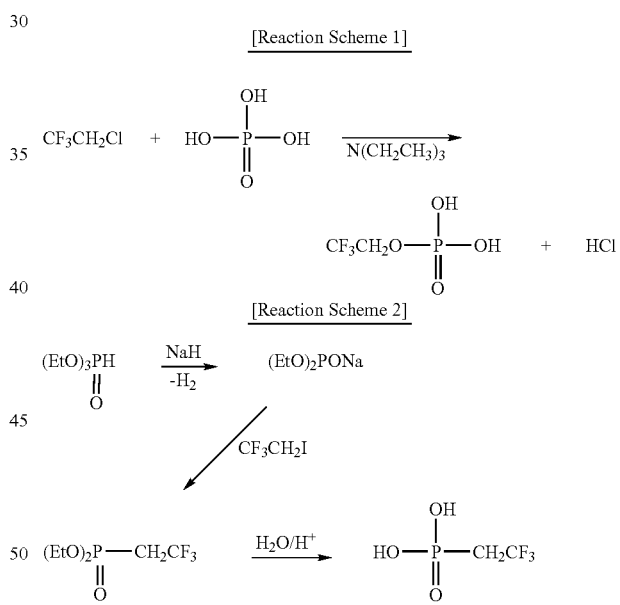

According to an embodiment of the invention, a method of producing a polymer electrolyte membrane containing the phosphoric acid substituted with an aliphatic hydrocarbon will be described. First, a mixed phosphoric acid is prepared such that the weight ratio of the phosphoric acid substituted with an aliphatic hydrocarbon to the ortho-phosphoric acid is in the range at or between 0.1:99.9 and 40:60. Then, the mixed phosphoric acid solution is impregnated into the polymer matrix such that the phosphoric acid substituted with an aliphatic hydrocarbon and the ortho-phosphoric acid are well permeated into the matrix. The impregnating temperature may be in the range at or between 40 and 80° C. When the impregnating temperature is less than 40° C., the viscosity of the mixed phosphoric acid solution is generally too high for impregnating the mixed phosphoric acid solution into the polymer matrix. When the impregnating temperature is higher than 80° C., an excessive amount of the mixed phosphoric acid solution is impregnated into the polymer matrix, thereby decreasing the mechanical strength of the polymer electrolyte membrane.

The impregnating time may vary according to the thickness and permeability of the matrix and the concentration of the mixed phosphoric acid solution. While not required in all aspects, the time may range from 10 to 120 minutes. When the impregnating time is shorter than 10 minutes, it is generally difficult to sufficiently impregnate the mixed phosphoric acid solution into the matrix. When the impregnating time is longer than 120 minutes, the effect of impregnation saturates.

The polymer electrolyte membrane prepared by impregnating as described above is coupled to an electrode to produce a membrane electrode assembly (MEA). The electrode is not limited and can be any electrode known in the art. The MEA may further include a diffusing layer and/or a backing layer. Materials composing the electrode, diffusing layer and/or backing layer, manufacturing methods, and coupling methods are not limited, and can be any materials and methods that are known in the art.

Figure 3:
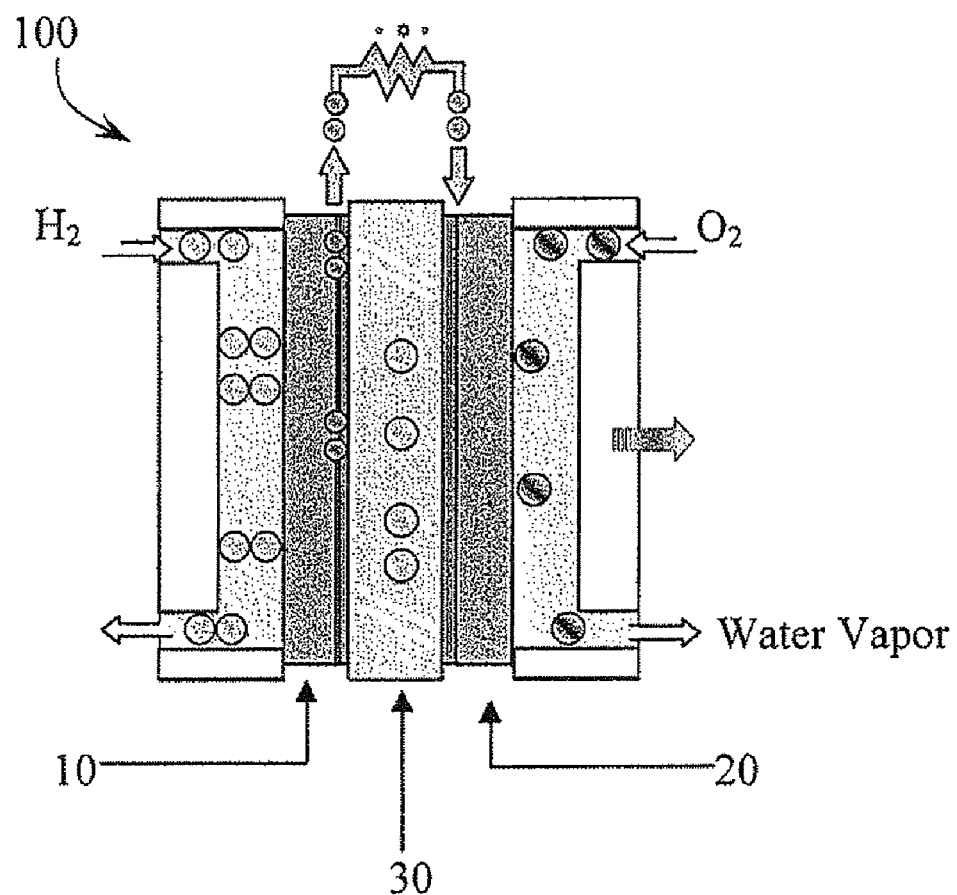
FIG. 3 is an illustration of a fuel cell according to an embodiment of the present invention.

An embodiment of the present invention, referring to FIG. 3, further provides a fuel cell 100 including the polymer electrolyte membrane 30. The fuel cell includes a cathode 20, an anode 10, and the polymer electrolyte membrane 30 according to an embodiment of the present invention interposed between the cathode 20 and the anode 10 as shown in FIG. 3.

A method of manufacturing the fuel cell is not limited and may be any method that is known in the art or developed hereafter. By way of example, the fuel cell may be a unit cell, or may be a stack of unit cells.

The polymer electrolyte membrane according to an embodiment of the present invention has excellent ion conductivity, heat resistance, and liquid-holding properties. The fuel cell that is produced using the polymer electrolyte membrane has excellent performance.

The structure and effects of the present invention will be described in further detail with reference to the following Examples and Comparative Examples. These Examples and the accompanying drawings are for illustrative purposes only and are not intended to limit the scope of the present invention. Physical properties of the Examples and Comparative Examples were measured using the following methods.

Ionic Conductivity

Ionic conductivity was measured using a 1287/1260 Solatron Impedance Analyzer with respect to various temperatures between 20° C. and 150° C. after a polymer electrolyte membrane was produced and after a fuel cell including the polymer electrolyte membrane operated for 16 hours.

Heat Resistance

A sample of a polymer electrolyte membrane was cut to a size of 2 cm×3 cm, placed in an 85% phosphoric acid solution or a mixed phosphoric acid solution, and then maintained at 150° C. for 4 hours.

In addition, the prepared polymer electrolyte membrane was crosslinked using a crosslinking agent, and then heated for 20 hours under the same conditions as above. The crosslinking agent was N,N-diglycidyl aniline.

Amount of Phosphoric Acid that is Impregnated in Polymer Matrix

A polymer matrix was immersed in a mixed phosphoric acid solution or an 85% phosphoric acid solution at 60° C. for 90 minutes. Then the amount of the phosphoric acid impregnated in the polymer matrix was measured by measuring the mass of the matrix before and after impregnation. As a standard, the amount of the phosphoric acid impregnated in the polymer matrix was expressed as 100% when a single phosphoric acid was coordinated with every nitrogen atom having a pair of unshared electrons in a polybenzimidazole repeat unit.

Liquid-Holding Property

The liquid-holding property was measured using a hot pressing device. A polymer electrolyte membrane was sandwiched between absorbing sheets that can absorb leaked phosphoric acid well when pressed, and then pressed at a pressure of 6 kg$_f$/cm$^2$ at 130° C. for 30 seconds to measure the amount of the phosphoric acid that was leaked. The amount of the phosphoric acid that was leaked was determined by measuring the mass of the polymer electrolyte membrane before and after the pressing.

EXAMPLE 1

A mono(trifluoroethyl)phosphate (produced from Johoku Chemical Inc.) represented by Formula 1 was mixed with 85% phosphoric acid in a weight ratio of 1:9 to prepare a mixed phosphoric acid solution. Then, a 30 μm-thick PBI layer (average molecular weight: 70,000) was immersed in the mixed phosphoric acid solution at 60° C. for 20 minutes.

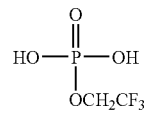

[Formula 1]

The ionic conductivity of the polymer electrolyte membrane prepared above was measured, and the results are shown in FIG. 1.

The heat resistance of the polymer electrolyte membrane prepared above was measured using the experimental method described above. It was found that the polymer electrolyte membrane was not dissolved in the phosphoric acid solution. Further, although the polymer electrolyte membrane was curled into a cylindrical shape, it maintained sufficient mechanical durability not to be disconnected when stretched. In addition, when the polymer electrolyte membrane was crosslinked to test heat resistance, the results were the same as when the polymer electrolyte membrane was not crosslinked.

The amount of the phosphoric acid impregnated in the polymer matrix, which was measured to test the liquid-holding property, was 870%. The liquid-holding property was measured by providing pressure as described above. The results are shown in Table 1.

EXAMPLE 2

A polymer electrolyte membrane was produced in the same manner as in Example 1 except that the mono(trifluoroethyl)phosphate was mixed with 85% phosphoric acid in a weight ratio of 2:8.

The ionic conductivity of the polymer electrolyte membrane prepared above was measured and the results are shown in FIG. 1.

The heat resistance of the polymer electrolyte membrane prepared in this example (Example 2) was measured using the experimental method described above. The results were the same as in Example 1. That is, the polymer electrolyte membrane did not dissolve in the phosphoric acid solution and it maintained sufficiently mechanical durability not to be disconnected when stretched. In addition, when the polymer electrolyte membrane was crosslinked to test heat resistance the results were the same as when the polymer electrolyte membrane was not crosslinked.

The amount of the phosphoric acid impregnated in the matrix, which was measured to test the liquid-holding property, was 930%. The liquid-holding property was measured by providing pressure as described above. The results are shown in Table 1.

COMPARATIVE EXAMPLE 1

A polymer electrolyte membrane was produced in the same manner as in Example 1 except that the mono(trifluoroethyl)phosphate was not used and only 85% phosphoric acid was used. The ionic conductivity of the polymer electrolyte membrane prepared in this manner was measured and the results are shown in FIG. 1.

The heat resistance of the polymer electrolyte membrane prepared in this example (Comparative Example 1) was measured using the experimental method described above. As a result, the entire polymer electrolyte membrane was dissolved in the phosphoric acid solution within 2 hours. In addition, the polymer electrolyte membrane was crosslinked and then the heat resistance of the crosslinked polymer electrolyte membrane was measured. In this case, the polymer electrolyte membrane was partially dissolved, and its mechanical strength was very low, which was visually identified. In this case, the polymer electrolyte membrane could not be picked up using a pincette.

The amount of the phosphoric acid impregnated in the polymer matrix, which was measured to test the liquid-holding property, was 750%. The liquid-holding property was measured by providing pressure as described above. The results are shown in Table 1.

TABLE 1

|  | Example 1 | Example 2 | Comparative Example 1 |
|---|---|---|---|
| Membrane matrix mass (g) | 0.0359 | 0.0321 | 0.0369 |
| Electrolyte impregnated mass (g) | 0.2766 | 0.2666 | 0.2399 |
| Mass before Pressing (g) | 0.3125 | 0.2987 | 0.2768 |
| Mass after Pressing (g) | 0.2860 | 0.2761 | 0.2480 |
| Leaked mass (g) | 0.0265 | 0.0228 | 0.0288 |

As shown in Table 1, the liquid-holding property of the poly electrolyte membrane according to Example 1 was about 8% greater than the liquid-holding property of the poly electrolyte membrane according to Comparative Example 1, and the liquid-holding property of the poly electrolyte membrane according to Example 2 was about 21% greater than the liquid-holding property of the poly electrolyte membrane according to Comparative Example 1.

Unit cells were manufactured using the polymer electrolyte membranes according to Examples 1 and 2 and Comparative Example 1, and performance tests for these unit cells were carried out using Pt catalyst-impregnated electrodes in the absence of humidity at 150° C. The amount of the Pt catalyst that was impregnated in the electrodes per unit area was 1.23 mg/cm$^2$. The results are shown in FIG. 2.

Figure 2:
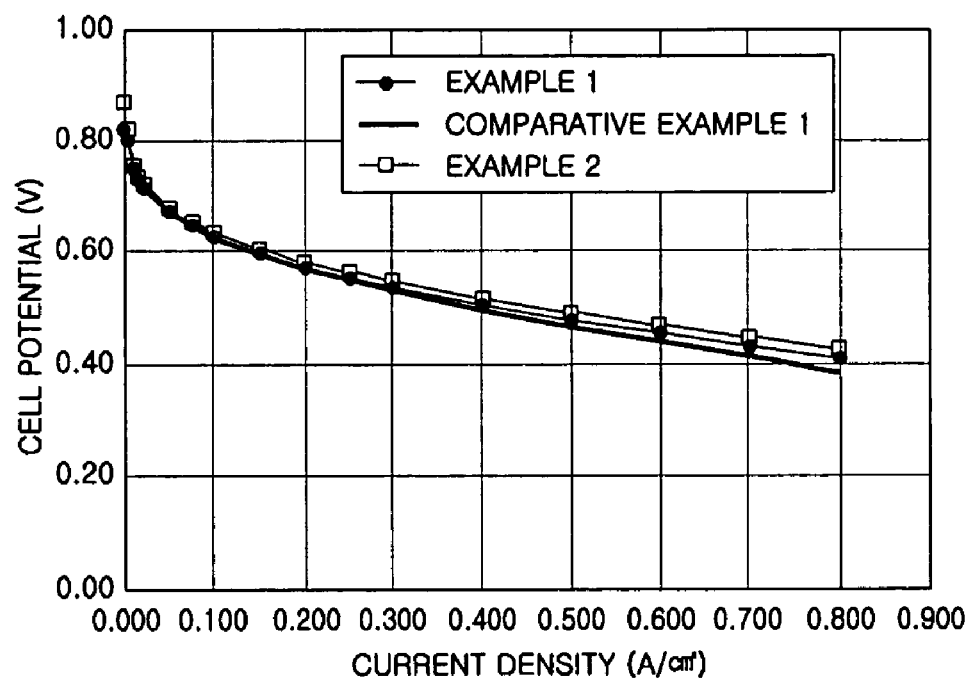
FIG. 2 is a graph illustrating performance test results for unit cells formed using the polymer electrolyte membranes according to Example 1 and 2 and Comparative Example 1.

Referring to FIG. 2, the unit cells produced using the polymer electrolyte membrane according to Examples 1 and 2 had 5-10% greater cell potential than the unit cell produced using the polymer electrolyte membrane according to the Comparative Example 1.

COMPARATIVE EXAMPLES 2 AND 3

Polymer electrolyte membranes were produced in the same manner as in Example 1 except that a phenyl phosphate was mixed with 85% phosphoric acid in weight ratios of 1:9 and 2:8. In this case, the phenyl phosphate did not dissolve in the ortho-phosphoric acid at all, and thus, tests could not be carried out. However, when the amount of the phenyl phosphate was about 0.07% by weight or less, the phenyl phosphate did dissolve. In this case, the ionic conductivity of the polymer electrolyte membrane prepared above was almost equal to the ionic conductivity of the ortho-phosphoric acid. That is, the use of phenyl phosphate leads to no effects on the ionic conductivity. The amount of the phosphoric acid impregnated in the polymer matrix, which was measured to test a liquid-holding property, was 760%, almost equal to 750%, the amount of the phosphoric acid that was impregnated in the polymer matrix measured when only 85% ortho-phosphoric acid was used.

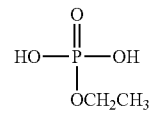

EXAMPLE 3

A polymer electrolyte membrane was produced in the same manner as in Example 1 except that a monoethyl phosphate was used instead of a mono(trifluoroethyl)phosphate.

The pH of the polymer electrolyte membranes according to Examples 1 and 3 was measured at their surfaces at 25° C. The results are shown in Table 2.

TABLE 2

|  | Example 1 | Example 3 |
|---|---|---|
| pH | 0.19 | 0.39 |

As shown in Table 2, the hydrogen ion concentration in Example 1 was about 1.6 times greater than the hydrogen ion concentration in Example 3. That is, it was expected that the polymer electrolyte membrane according to Example 1 would have excellent ionic conductivity corresponding to the increase in the hydrogen ion concentration.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte membrane comprising a benzimidazole-based polymer matrix impregnated with a phosphoric acid, some of the phosphoric acid being a substituted phosphoric acid having one or two hydrogen atoms substituted with one or two substituents selected from the group consisting of alkenyl groups, alkynyl groups, alkoxy groups, alkyl groups substituted with at least one halogen atom, and combinations thereof.

2. The polymer electrolyte membrane of claim 1, wherein the halogen atom is fluorine.

3. The polymer electrolyte membrane of claim 1, wherein an amount of the substituted phosphoric acid is in a range at or between 0.1 and 40% by weight based on the weight of all the phosphoric acid.

4. The polymer electrolyte membrane of claim 1, wherein an amount of the substituted phosphoric acid is in a range at or between 5.0 and 25.0% by weight based on the amount of all of the phosphoric acid.

5. A membrane electrode assembly comprising the polymer electrolyte membrane of claim 1.

6. A fuel cell comprising:
   a cathode;
   an anode; and
   the polymer electrolyte membrane of claim 1 interposed between the cathode and the anode.

7. A method of manufacturing a polymer electrolyte membrane, the method comprising:
   preparing a mixed phosphoric acid solution by mixing a phosphoric acid having one or two hydrogen atoms substituted with an aliphatic hydrocarbon, and an orthophosphoric acid; and
   impregnating the mixed phosphoric acid in a benzimidazole-based polymer matrix.

8. The method of claim 7, wherein the aliphatic hydrocarbon is an alkyl group, an alkenyl group, and alkynyl group, an alkoxy group, or combinations thereof.

9. The method of claim 8, wherein the alkyl group is substituted with a halogen atom.

10. The method of claim 7, wherein the amount of the phosphoric acid substituted with an aliphatic hydrocarbon is in a range at or between 0.1 and 40% by weight based on the total weight of the mixed phosphoric acid solution.

11. The method of claim 7, wherein the amount of the phosphoric acid substituted with an aliphatic hydrocarbon is in a range at or between 5.0 and 25.0% by weight based on the total weight of the mixed phosphoric acid solution.

12. The method of claim 7, wherein the impregnating is performed at a temperature ranging at or between 20° C. and 80° C. for 10 minutes to 20 minutes.

\* \* \* \* \*

UNITED STATES PATENT AND TRADEMARK OFFICE
CERTIFICATE OF CORRECTION

| | |
|---|---|
| PATENT NO. | : 7,968,247 B2 |
| APPLICATION NO. | : 11/433527 |
| DATED | : June 28, 2011 |
| INVENTOR(S) | : Doo-yeon Lee et al. |

It is certified that error appears in the above-identified patent and that said Letters Patent is hereby corrected as shown below:

In the Claims

Column 9, Claim 4, line 5        Delete "1 ,"
                                 Insert -- 1, --

Column 10, Claim 8, line 4       Delete "and"
                                 Insert -- an --

Signed and Sealed this
Twenty-second Day of May, 2012

David J. Kappos
*Director of the United States Patent and Trademark Office*